Patented Mar. 27, 1928.

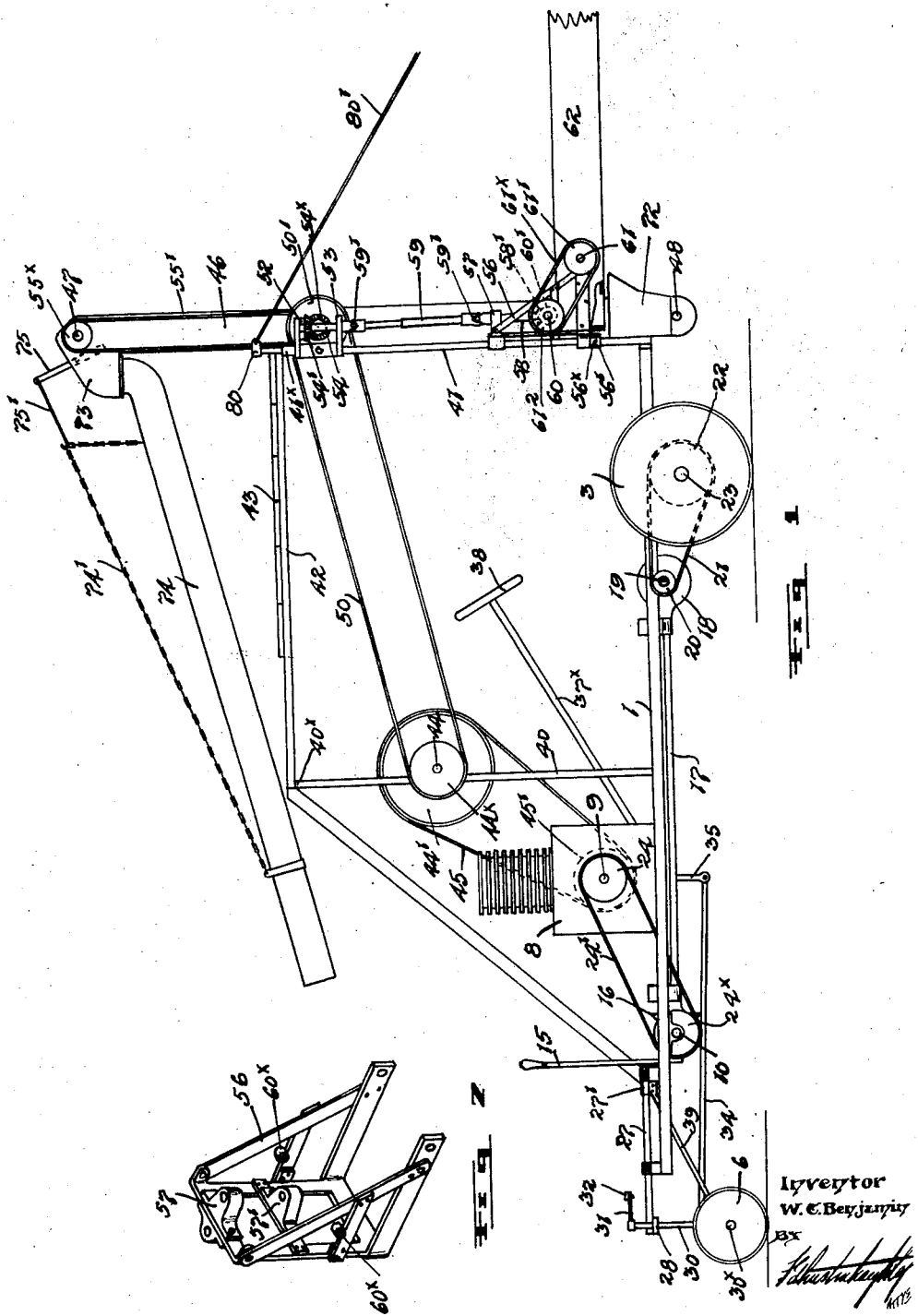

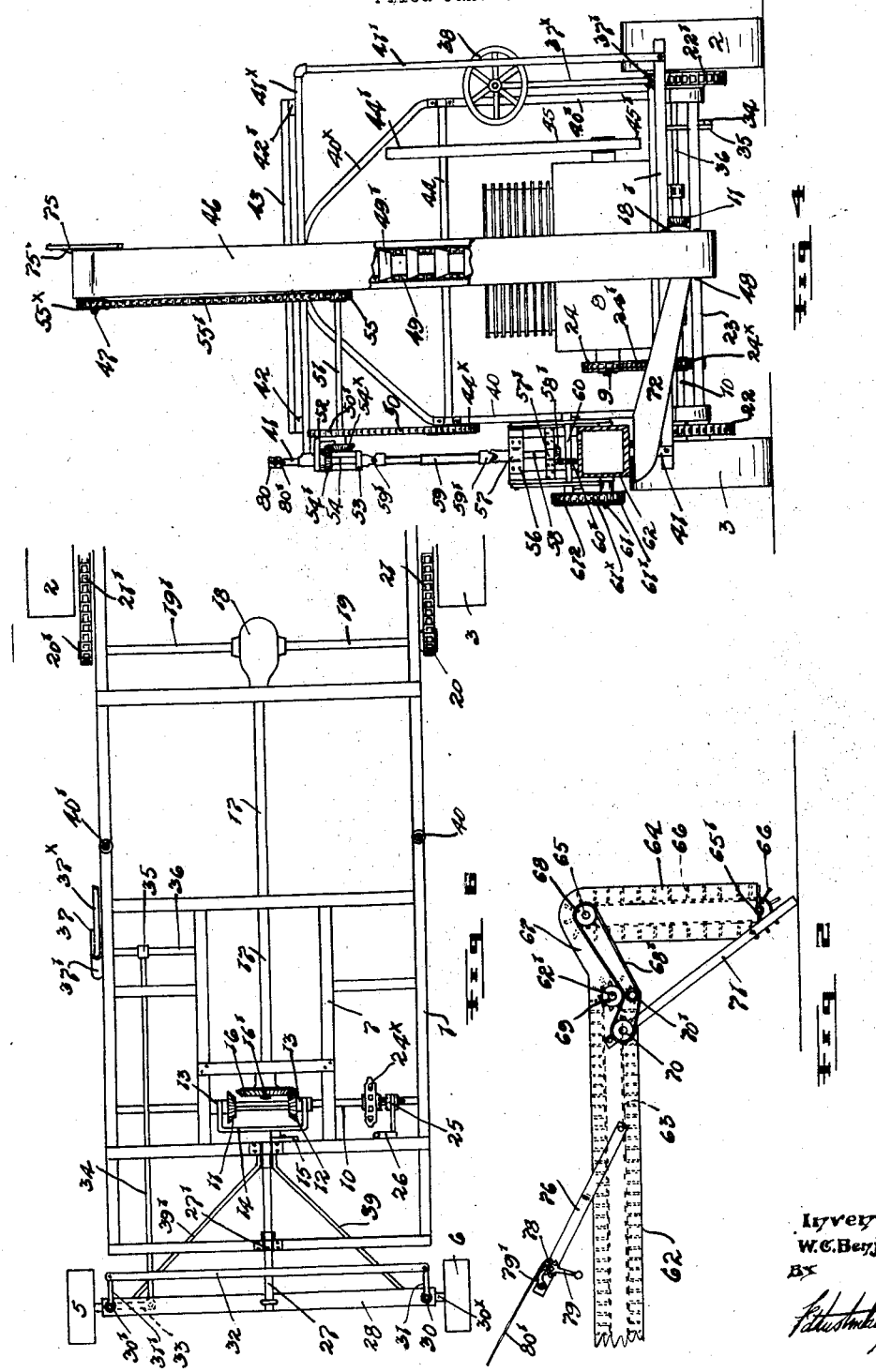

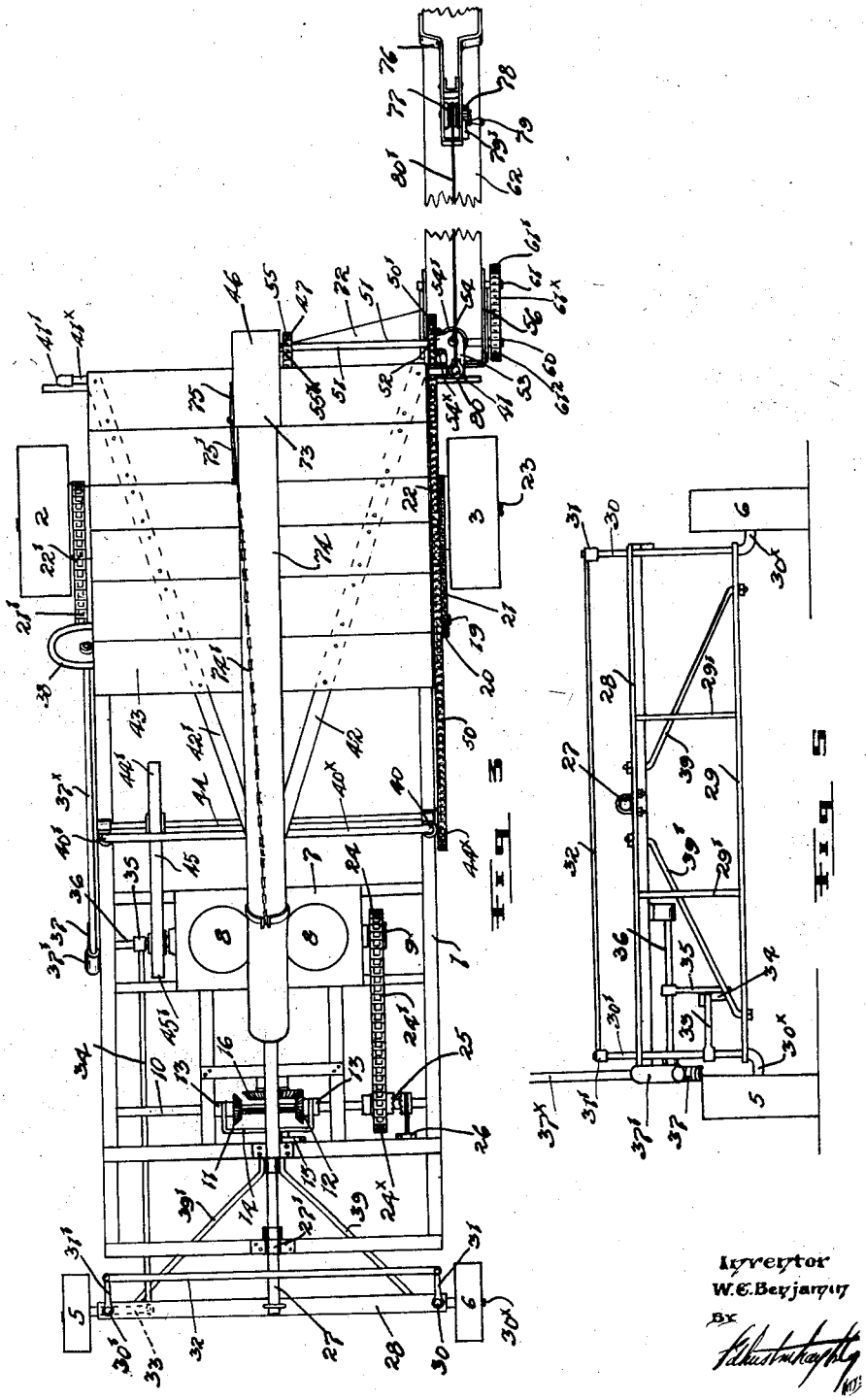

1,663,825

UNITED STATES PATENT OFFICE.

WILLIAM C. BENJAMIN, OF UNITY, SASKATCHEWAN, CANADA.

GRAIN LOADER.

Application filed January 3, 1927. Serial No. 158,708.

The invention relates to improvements in grain loaders and an object of the invention is to provide a portable power driven machine for loading grain such as from a granary into a wagon and further to construct the machine so that it can be readily controlled by a single operator, easily steered from place to place and adjusted to suit existing conditions and such that the rear conveyor and the discharge chute can be folded in adjacent the machine body when not in use.

With the above more important and other minor objects in view which will become more apparent as the description proceeds, the invention consists essentially in the arrangement and construction of parts hereinafter more particularly described, reference being had to the accompanying drawings, in which:—

Fig. 1 is a side view of the complete machine, the rear end of the rear conveyor being removed.

Fig. 2 is a side view of the rear end of the rear conveyor.

Fig. 3 is a plan view of the machine.

Fig. 4 is a rear view of the machine, the rear conveyor being shown in vertical section.

Fig. 5 is a front view of the steering mechanism.

Fig. 6 is a plan view of the forward portion of the machine frame, the upper part of the machine being removed.

Fig. 7 is a perspective view of the swivelled carrier which supports the forward end of the rear conveyor.

In the drawings like characters of reference indicate corresponding parts in the several figures.

The main frame 1 of the machine is substantially rectangular and it is supported rearwardly by traction wheels 2 and 3 and forwardly by steering wheels 5 and 6. Centrally of the frame I locate an engine platform 7 on which an engine 8 of any approved type is mounted, the engine driving shaft being indicated by the reference numeral 9.

Forwardly of the frame I locate a counter shaft 10 which is provided with two bevel pinions 11 and 12 feathered on the counter shaft and connected one to the other so that they can be simultaneously shifted. In the present instance, the pinions are provided with sleeves 13 which are rotatably mounted in the ends of a coupling bar 14 and the coupling bar is pivotally attached to the lower end of a lever 15 suitably carried by the frame, the arrangement being such that by manipulating the lever I can simultaneously shift the pinions on the counter shaft.

A gear wheel 16 is located between the beveled pinions and is carried by the forward end of a driving shaft 16' housed within the driving shaft casing 17. A differential gear box 18 is located at the rear end of the casing 17 and houses the customary differential gears which are driven by the gear 16 and are utilized to drive the rear shafts 19 and 19' which latter are equipped with chain wheels 20 and 20', the chain wheels being connected by chains 21 and 21' to chain wheels 22 and 22' associated with the traction wheels 2 and 3 and mounted on the shaft 23.

The engine shaft 9 is provided at one end with a chain wheel 24 which is connected by a chain 24' to a chain wheel 24ˣ rotatably mounted on the counter shaft 10 and a clutch indicated generally by the reference numeral 25 is provided for coupling the chain wheel 24ˣ to the counter shaft when desired, the clutch being under the control of a hand lever 26.

According to the above arrangement, I can drive the machine forward or back by first throwing the clutch lever 26 into a position such that the engine will drive the counter shaft and then shifting the pinions 11 and 12 to bring one or other of said pinions into contact with the bevel gear 16.

Whilst I have entered into a detailed description of the latter parts, it will be readily understood that they could be readily modified without departing from the spirit of the invention as any well known arrangement can be used for driving the counter shaft from the engine and selectively driving the traction wheels in a forward or reverse direction as desired.

Forwardly of the frame, I locate a centrally disposed pipe or tube 27 which is suitably mounted in bearings 27' provided. To the forward end of the tube, I connect a cross bar 28 and underneath the cross bar I locate a further cross bar 29 suitably connected thereto by brace bars 29'. The ends of the bars 28 and 29 carry rotatably vertically disposed shafts 30 and 30' the lower ends of which are outturned to provide spindles 30$^x$ on which the steering wheels 5 and 6 are rotatably mounted. The upper ends of the shafts 30 and 30' carry cranks 31 and 31' and the cranks are connected by a connecting rod 32 so that they move together. A further crank 33 is secured to the shaft 30' and is connected pivotally to the forward end of a steering rod 34, the rear end of which is pivotally attached to a crank 35 carried by a comparatively short shaft 36 rotatably carried in suitable bearings provided on the frame.

The outer end of the shaft 36 is supplied with a worm wheel 37 which is engaged by a worm 37' located at the forward end of a steering post 37$^x$. The upper end of the post is supplied with a hand wheel 38 for steering purposes, the arrangement being such that in the turning of the hand wheel, one simultaneously turns the steering wheels in the direction in which it is desired to go. Radius rods 39 and 39' extend between the lower bar 29 and the rear end of the pipe 27.

Centrally to the sides of the main frame, I secure opposing upstanding legs 40 and 40' connected by a bowed cross arm 40$^x$ and rearwardly to the frame I secure upstanding corner posts 41 and 41' connected by a cross arm 41$^x$. Forwardly converging, horizontally disposed beams 42 and 42' are supported by the cross arms 40$^x$ and 41$^x$ and these carry an elevated, horizontally disposed platform 43. The legs 40 and 40' are provided with suitable bearings which support rotatably an elevated cross shaft 44 which is provided at one end with a pulley 44' and at the other end with a chain wheel 44$^x$. The pulley 44' is connected by a belt 45 to a pulley 45' on the engine driving shaft 9.

Centrally to the rear end of the main frame and to the rear end of the elevated platform, I secure a vertically disposed grain elevator 46 of any approved design. The elevator is herein shown as presenting the upper elevator shaft 47 and the lower elevator shaft 48, the shafts being utilized to drive the customary endless chains 49 which carry the cups 49' or such like grain elevating devices.

The chain wheel 44$^x$ carries a chain 50 which drives a chain wheel 50' mounted on an elevated shaft 51, one end of which is rotatably carried by the elevator casing and the other end of which is rotatably mounted in a bracket 52 carried by the post 41. The post 41 carries a further U-shaped bracket 53 which supports rotatably a vertical spindle 54, the spindle being provided with a bevel pinion 54' which is continuously in mesh with a bevel pinion 54$^x$ secured to the adjacent end of the shaft 51, the arrangement being such that the spindle is driven when the shaft 51 is rotated. The shaft 51 is also supplied with a chain wheel 55 which is connected by a chain 55' to a chain wheel 55$^x$ secured to the end of the upper elevator shaft 47.

On the lower end of the post 41 I mount rotatably a carrier 56 (see Figure 7), the carrier being supported by a collar 56' secured to said post by a jam screw 56$^x$. The carrier provides vertically aligned bearings 57 and 57' which receive rotatably a vertically disposed spindle 58. The upper end of the spindle 58 is connected to the lower end of the spindle 54 by a telescopic driving shaft 59, the ends of which are connected to the respective spindles by universal joints indicated at 59'. The lower end of the spindle 58 is provided with a bevel pinion 58' which meshes with a bevel pinion 60' carried by a cross shaft 60, suitably mounted in horizontally aligned bearings 60$^x$ carried by the carrier. The carrier also supports a rearwardly disposed rotatably mounted cross shaft 61 on which I mount rotatably the forward end of a rearwardly extending grain conveyor 62 of any approved type.

The shaft 61 is supplied with a chain wheel 61' driven by a chain 61$^x$ operating over a further chain wheel 61$^2$ secured to the shaft 60. The rear end of the conveyor carries also a cross shaft 62' and the shafts 61 and 62' are provided with endless chains and plates or wings indicated generally by the reference numeral 63, the wings being adapted to deliver grain forwardly over the bottom of the conveyor casing when the same is driven by the telescopic shaft.

The rear end of the conveyor 62 communicates with a vertically disposed pick up 64 which also embodies upper and lower cross shafts 65 and 65' connected by endless chains carrying wings or plates 66. Here it will be observed that the wings are exposed at the lower end of the pick up so that when driven they will gather grain underlying the same and elevate it to a position where it is discharged through the neck 67 to the conveyor. The upper shaft 65 is provided with a chain wheel 68 and it is driven by a chain 68' from a chain wheel 69 secured to the shaft 62', there being suitable idler chain wheels 70 and 70' provided also to carry the chain.

The rear end of the conveyor carries a substantially U-shaped foot piece 71 which straddles the lower end of the pick up and is clear of the wings thereof and serves to guard the lower end of the pick up as will readily be understood. The forward end of the conveyor 62 is adapted to deliver grain into the open mouth of an underlying hopper 72 carried by the frame and the hopper delivers such grain into the lower end of the vertically disposed elevator 46.

The upper end of the elevator 46 terminates in a discharging head 73 which delivers the grain into a swivelled discharge spout 74, the spout being suitably suspended by a chain 74' and a tie rod 75' from an arm 75 secured permanently to the head.

The rear end of the conveyor is provided with a bail bar 76 which carries a winding drum 77 with which I associate a ratchet wheel 78 and crank 79 and the bail bar carries a pall 79' engaging the ratchet wheel 78. A cable 80' is connected to the drum and passes to the upper end of the post 41 where it is fastened to a swivel 80 mounted on the upper end of said post.

When the machine is not in use, the spout 74 is swung in over the elevated platform and occupies a position such as shown in Figures 1 and 3 and the conveyor and pick up carried thereby are swung forwardly to lie at one side of the machine in a position over the rear wheel 3 and here it will be observed that the carrier 56 rotates on the post 41 at this time and the telescopic shaft 59 lengthens to permit of the movement.

When the machine is being moved from place to place, the spout and conveyor will occupy the position just mentioned which is their folded position and the machine can accordingly travel on a roadway over a bridge or through a gate without interference. When the machine is travelling from place to place, the belt 45 will be dismounted from one of its carrying pulleys and obviously the wheels 2 and 3 will be driven directly from the engine, the clutch 25 being in. The attendant can cause the machine to advance or back up by manipulating the lever 15.

When it is desired to use the machine, such as for elevating grain from a granary into a wagon, it will be maneuvered into the most advantageous position and the attendant will then place the conveyor in the granary with the lower end of the pick up riding on the grain and will also place the spout so that it will deliver into the attending wagon. He will then throw out the clutch 25 and apply the belt 45 on the pulleys and such will cause the driving of the pick up, the conveyor and the elevator and the grain caught by the pick up will be delivered to the conveyor and the conveyor will discharge it into the hopper 72 which in turn directs it to the elevator where it is raised to the head 73 and is delivered into the spout 74 from which it discharges into the wagon.

The pick up end of the conveyor can be suspended at varying heights as desired by adjusting the winding drum as will be readily understood or the pall can be entirely released from the ratchet wheel to allow the pick up to feed itself into the grain. From the description, it will be apparent that the rear end of the conveyor can be raised or lowered and can also be swung side ways so that it is an easy matter to accommodate it best to the conditions existing at the granary. I also point out that if it is desired to raise the forward end of the conveyor, this can be done by raising the carrier on the post 41 and resetting the collar 56' in a higher position.

I have not entered into a detailed description of the internal structure of the pick up, the conveyor or the elevator as such grain delivering devices are well known to those familiar with the art and obviously any of the well known appliances could be used without departing from the spirit of the invention.

What I claim as my invention is:—

1. In a grain loader, in combination, a portable frame, an upright driven grain elevator carried by the frame, a rearwardly extending adjustable grain driven conveyor delivering grain to the lower end of the elevator, a driven grain pick up conveyor carried by the rear end of the latter conveyor and delivering to the same and a pivoted discharge spout suspended from and receiving grain from the upper end of the elevator.

2. In a grain loader, in combination, a portable main frame, a vertically disposed grain elevator located rearwardly of and carried by the main frame, a rearwardly extending adjustable grain conveyor carried by the rear end of the frame, a hopper underlying the forward end of the conveyor and discharging into the lower end of the elevator, a grain pick up located at the rear end of the conveyor and delivering to the same, a grain discharge spout swivelly attached to the upper end of the elevator and receiving grain therefrom and means for simultaneously driving the elevator, the conveyor and the pick up.

3. In a grain loader, in combination, a substantially rectangular wheeled power driven frame, a vertically disposed centrally located grain elevator mounted on the rear end of the frame, a vertically and laterally swingable grain conveyor having the forward end thereof carried by one of the rear corners of the frame, means adjustably suspending the rear end of the conveyor, a vertically disposed grain pick up conveyor located at the rear end of the latter conveyor, a hopper carried by the rear end of the frame and underlying the forward end of the former conveyor and discharging into the lower end of the elevator, a discharge spout swivelly attached to the upper end of the elevator and receiving the grain discharge therefrom and means for simultaneously driving the elevator and the conveyor.

4. In a grain loader, the combination with a substantially rectangular portable frame and a rearwardly disposed vertically extending grain elevator carried by the frame, of a rearwardly extending vertically and laterally adjustable grain conveyor mounted on one of the corners of the frame, a hopper carried by the frame and underlying the forward end of the conveyor and discharging into the lower end of the elevator, a vertically disposed pick up conveyor carried by the rear end of the latter conveyor, means for driving the elevator, means for driving the former conveyor in all adjusted positions and a driving connection between the latter conveyor and the pick up conveyor.

Signed at Unity, Saskatchewan this 13th day of September 1926.

WILLIAM C. BENJAMIN.